L. E. BAKER.
DISPENSING FAUCET.
APPLICATION FILED FEB. 9, 1920.

1,348,839.

Patented Aug. 10, 1920.
2 SHEETS—SHEET 1.

INVENTOR.
Linnaeus E. Baker
BY
Walter A. Knight.
ATTORNEY.

L. E. BAKER.
DISPENSING FAUCET.
APPLICATION FILED FEB. 9, 1920.
1,348,839.
Patented Aug. 10, 1920.
2 SHEETS—SHEET 2.
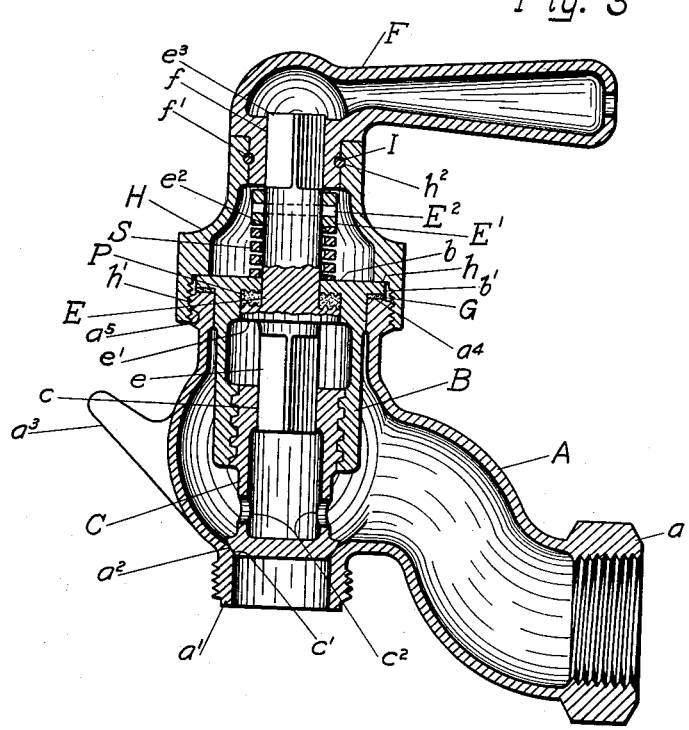
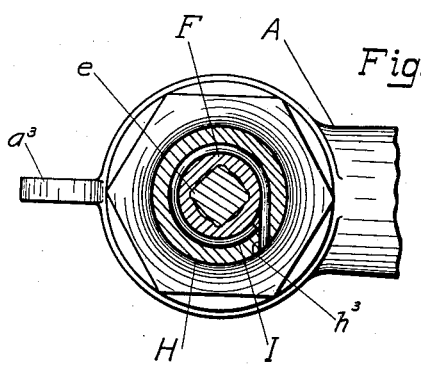
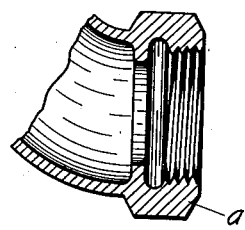
INVENTOR.
Linnaeus E. Baker
BY Walter A. Knight
ATTORNEY.

UNITED STATES PATENT OFFICE.

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

DISPENSING-FAUCET.

1,348,839.

Specification of Letters Patent.  Patented Aug. 10, 1920.

Application filed February 9, 1920. Serial No. 357,233.

*To all whom it may concern:*

Be it known that I, LINNAEUS E. BAKER, a citizen of the United States, residing at Fort Wayne, in the county of Allen and State of Indiana, have invented new and useful Improvements in Dispensing-Faucets, of which the following is a specification.

My invention relates to valves and particularly the type generally known as packless valves, by which name those valves are known that have no stuffing box filled with fibrous packing material to prevent leakage around the valve stem. Such valves are especially valuable for handling gasolene and other volatile fluids.

My invention not only provides a thoroughly efficient valve for the purpose, but is simple in design, is strong, has few parts, would tend to discourage meddlesome persons, the wear of working parts is reduced to the minimum, lends itself to cheap and accurate manufacture and can be quickly assembled. It also permits assembling in such a manner as to always have the handle in a definite position when the valve is closed so that any one can tell at a glance whether the valve is closed or not.

The particular embodiment of my invention selected for illustration, is a faucet for gasolene or other volatile fluids. In the accompanying drawings of same:—

Fig. 3 is a vertical, axial section on the line 3—3 of Fig. 2.

Fig. 4 is a cross section on the line 4—4 of Fig. 1 and

Fig. 5 is a modification of the inlet opening formed to receive an exteriorly threaded hose connection.

Figure 1:
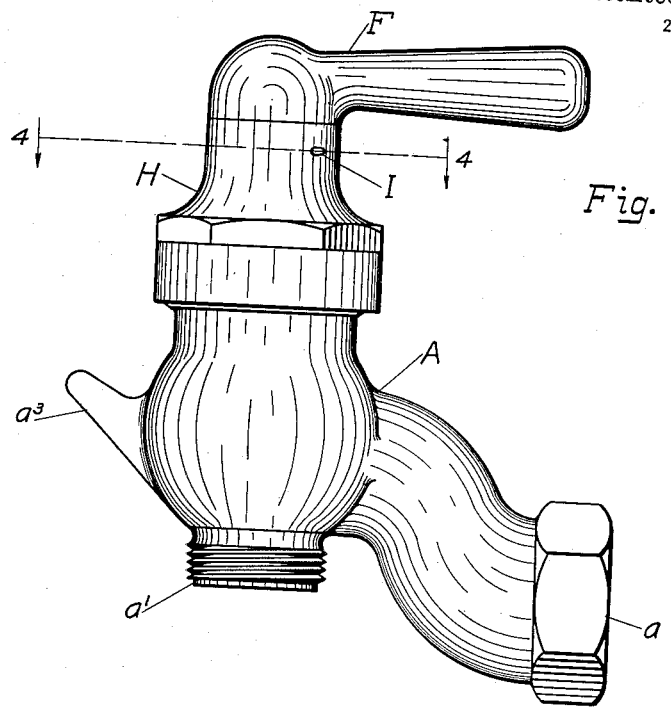
Figure 1 is a side elevation of the faucet assembled ready for attachment and use.

Referring now to the drawings, A is the valve body adapted to be secured to a liquid supply pipe at $a$, and having a discharge outlet $a^1$. In Fig. 5 the inlet opening $a$, is formed to receive a gasket and exteriorly threaded hose connection in the usual manner. At the outlet the body is suitably shaped to form a seat $a^2$ for the valve C, hereinafter described. A hook $a^3$ for a bucket-bale is provided in the usual manner.

A cylindrical valve guide B is threaded interiorly at the lower end, preferably by a thread of steep pitch so as to make the valve open and close quickly; and a cylindrical valve C is exteriorly threaded on its upper portion into the valve guide. The upper inner portion $c$ of the valve is squared to form a sliding fit for the squared lower portion $e$ of the unitary valve stem E, hereinafter described. Rotation of the valve stem E, rotates the valve C and causes the valve face $c^1$ to be raised from or lowered onto the seat $a^2$. Holes $c^2$ in the valve allow the liquid whose flow is controlled by the valve to pass freely out of and into the interior of the valve C, as the valve stem E enters and recedes.

Above the squared portion $e$ the valve stem has an annular boss $e^1$ upon the upper side of which a packing ring P rests.

The valve guide B at its top has an inwardly extending flange $b$ and an outwardly extending flange $b^1$. The flange $b$ forms an axial opening just large enough to form a sliding fit with the cylindrical portion $e^2$ of the valve stem. The under side of the flange $b$ seats upon the packing ring P. The under side of the flange $b^1$ has a gasket G between it and the annular top $a^4$ of the body A.

The bonnet H has an annular interior shoulder $h$, and an interior thread $h^1$ corresponding to the exterior thread $a^5$ on the body near the top, so that when the bonnet is screwed down on the body, the valve guide is securely clamped in position.

A collar $E^1$ on the valve stem is held in position in any suitable manner as by the taper-pin $E^2$. A spring S is compressed between the upper side of the flange $b$ and the lower side of the collar $E^1$ and at all times compresses the packing ring P tightly between the flange $b$ and the boss $e^1$ forming a leak-tight joint. The surfaces bearing upon the packing ring may be provided with one or more annular ridges if desired.

The handle F has its axial opening $f$ squared to form a wrench for the squared portion $e^3$ of the valve stem. The handle has an exterior groove $f^1$ and the upper portion of the bonnet has an interior corresponding groove $h^2$ together forming a cylindrical ring opening. A hole $h^3$ is bored tangentially through the bonnet to connect with this opening and a wire pin I is driven in as shown in Fig. 4 encircling the stem and securing the handle to the bonnet but permitting free interrotation. When assembled the bonnet and handle cannot be separated without mutilation of the parts.

It will be apparent that any pressure of liquid from within the device on the valve stem, must tend to force it upward and cause the boss $e^1$ to seat more tightly upon the packing ring P.

Figure 2:
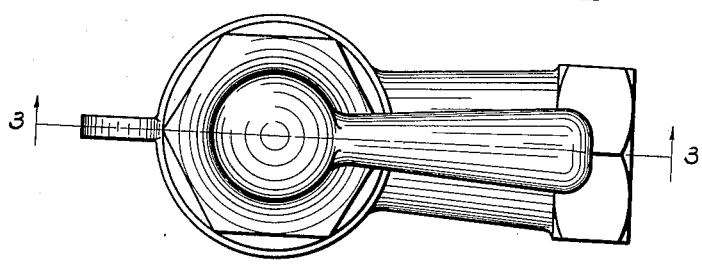
Fig. 2 is a top plan view of same.

The handle can be made to assume any desired position when the valve is closed, such as the one shown in Figs. 1, 2 and 3 in the following manner:—Just before the bonnet is given the final part turn which clamps the valve guide to the body, the handle is turned to the desired position, taking care to see that the valve has been brought to seating position, and the bonnet is then turned to clamping position.

It will also be apparent that the device cannot be caused to work defectively by meddlesome or maliciously disposed persons unless the valve is broken or the bonnet unscrewed from the body. As the handle is guided by the bonnet, the valve stem cannot be thrown out of line and the valve opened so as to leak by pressing or bumping down or up on the handle.

While I have described in detail the particular construction of my invention which is the best form known to me, it is evident that the parts may be varied in form, construction and arrangement without departing from the spirit and scope of my invention, and therefore I do not limit myself to the particular construction and arrangement shown.

I claim as my invention and desire to secure by Letters Patent of the United States:—

A valve comprising a casing made up of a body, a bonnet, a unitary valve-stem and a handle, a valve-guide having an inwardly extending flange with an axial opening and adapted to be clamped in axial relation to the body by the union of the body and bonnet, a valve threaded to the valve-guide and adapted to be raised and lowered by the rotation of the valve-stem, said unitary valve-stem having an annular boss intermediate of its ends, a packing-ring compressed betwen said annular boss and said valve-guide flange, a removable collar on the valve-stem, a spring normally compressed between said collar and said valve-guide flange, said handle adapted to be used in rotating said valve-stem and means for permanently securing the handle to the bonnet in such a manner as to permit free interrotation.

In testimony whereof I have hereunto set my hand in presence of two subscribing witnesses.

LINNAEUS E. BAKER.

Witnesses:
J. M. KLINGNEBERGER,
W. A. ARNOLD.